June 3, 1969  F. W. WATLINGTON  3,448,432
ISOLATOR FOR TOWED HYDROPHONE

Filed Nov. 2, 1967  Sheet 1 of 2

INVENTOR.
Francis W. Watlington
BY
C. E. Vautrain Jr., Agent

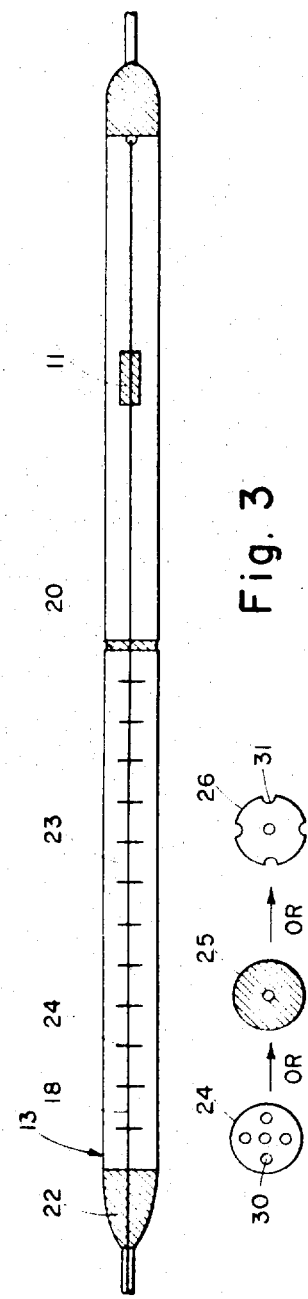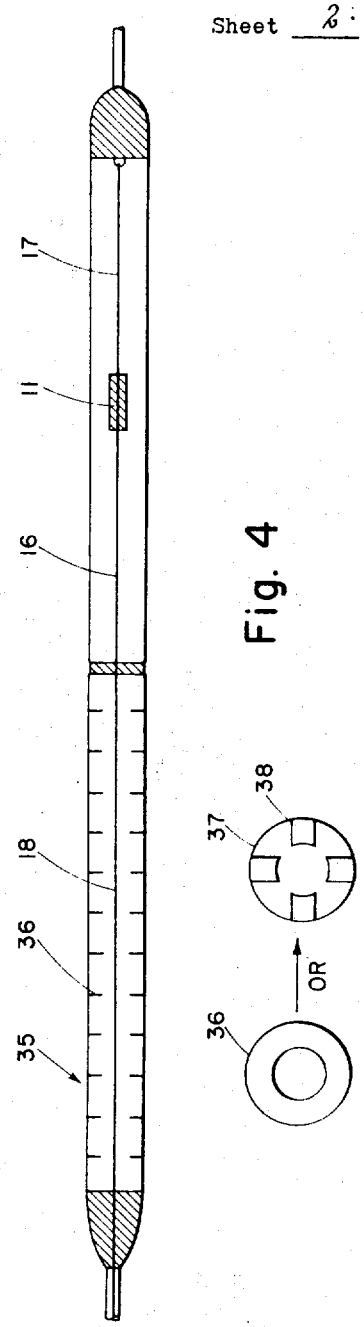

United States Patent Office 3,448,432
Patented June 3, 1969

3,448,432
ISOLATOR FOR TOWED HYDROPHONE
Francis W. Watlington, Pembroke, Bermuda, assignor, by mesne assignments, to the United States of America as represented by the Secretary of the Navy
Filed Nov. 2, 1967, Ser. No. 680,157
Int. Cl. H04b 13/02
U.S. Cl. 340—5                                                               9 Claims

ABSTRACT OF THE DISCLOSURE

An isolator is provided which is formed of a fluid-filled compliant member so as to induce fluid flow upon the occurrence of selected tension in the towing cable. Baffles are secured within the member either to axially extending electrical conductors or to the inner surface of the member to cause energy dissipating turbulence.

---

The invention described herein may be manufactured and used by or for the Government of the United States of America for governmental purposes without the payment of any royalties thereon or therefor.

This invention relates to a device for dissipating vibrational noise and more particularly to a stretchable isolator which is relatively short and yet provides desired interference reduction or cancellation.

It has been conventional to accomplish noise reduction in hydrophones or other instruments towed underwater by separating the towing cable from the vehicle carrying the hydrophone with a section of elastic hose. Such hose is usually made of rubber and achieves noise reduction by a combination of the elasticity of the rubber, friction between the medium and the hose, and friction between oil filling the isolator and the inner surface of the isolator. The friction, which is also referred to as mechanical rectilinear resistance, tends to dissipate the vibrations as heat. In the conventional devices, however, there has been an insufficient amount of friction so that tremendously long isolators have been required to provide sufficient noise damping or dissipation of the undesired oscillations by frictional heat. These long isolators are difficult to handle at sea and their increased length renders the entire assembly more vulnerable to accidential damage.

The disadvantages of conventional isolators are overcome by the system of the present invention whereby a shortened isolator is made possible through the use of a compliant outer member and the addition of energy damping or storage elements disposed in the isolator.

Accordingly, it is an object of the present invention to improve the effectiveness of towed hydrophone isolators by reducing the vibrational noises caused by ship motion and cable strum.

Another object of this invention is to effect a reduction in or elimination of vibrational noises in towed hydrophones by inducing and then impeding the movement of damping fluid in isolators interposed between the towing ship and the hydrophone carrier.

Other objects, advantages and novel features of the invention will become apparent from the following detailed description thereof when considered in conjunction with the accompanying drawings in which like numerals represent like parts throughout and wherein:

FIG. 3 is a sectional view of one embodiment of the isolator of the present invention;

FIG. 3a illustrates one form of baffle which may be used in the isolator embodiment of FIG. 3;

FIG. 3b illustrates another form of baffle which may be used in the isolator embodiment of FIG. 3;

FIG. 3c illustrates still another form of baffle which may be used in the isolator embodiment of FIG. 3;

FIG. 4 is a sectional view of another embodiment of the isolator of the present invention;

FIG. 4a illustrates one form of baffle which may be used in the isolator embodiment of FIG. 4; and FIG. 4b illustrates another form of baffle which may be used in the isolator embodiment of FIG. 4.

Figure 1:
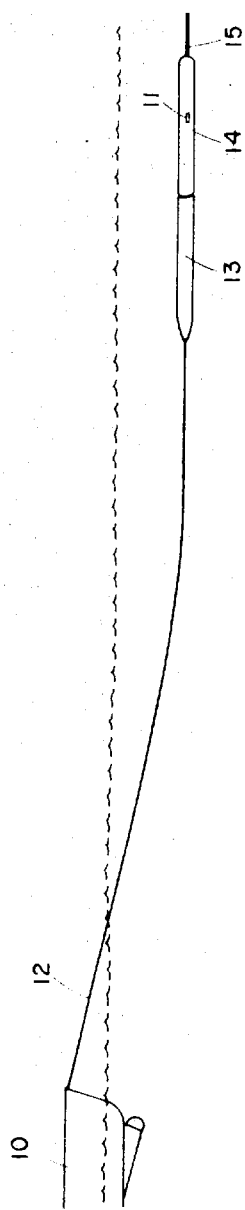
FIG. 1 is a perspective view showing a towing assembly in which the present invention may be utilized.
Figure 2:
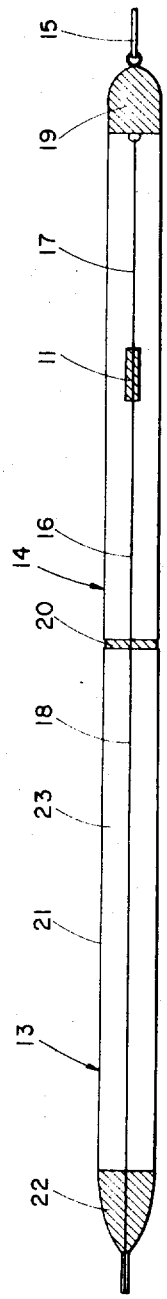
FIG. 2 illustrates conventional means for accommodating a hydrophone and reducing vibrational noises.

Referring to FIGS. 1 and 2, a towing ship 10 is shown towing a hydrophone 11 by means of tow cable 12 and isolator 13. Hydrophone 11 is contained in a hydrophone carrier 14 which preferably has attached at the aft end a drag line 15 for promoting stability along the line of motion. Isolator 13 preferably is connected at the immediate forward end of hydrophone carrier 14 so that additional strum and vibrational noise is not generated between the isolator and the hydrophone.

In FIG. 2 isolator 13 and hydrophone carrier 14 are shown in greater detail such that it may be noted that the hydrophone 11 is suspended in carrier 14 by electrical conductors 16 and 17 connecting the fore and aft ends respectively to a compliant electrical conductor 18 and a tailpiece 19. A feedthrough for the electrical conductors, not shown, is provided in bulkhead 20 which separates isolator 13 and carrier 14. Carrier 14 preferably is oil filled to protect the hydrophone from accidental damage.

Isolator 13 is formed of a compliant sleeve member 21 preferably made of rubber the counterpart of which in conventional isolators is nonstretchable and merely serves to dissipate vibrational energy by flexure and absorption of vibration. In both conventional and the present form of the isolator, the sleeve member is hollow and is provided with headpiece 22 which is steamlined to decrease water resistance and create the least additional disturbance. Oil is used to fill the cavity 23 in compliant member 21 of the present embodiment as well as the noncompliant member in the conventional form of isolator. To provide desired additional energy dissipation, the present isolator employs a compliant material such as rubber to form the walls of chamber 23 which material may be stretched appreciably under towing strain. The electrical conductors 18 which traverse oil-filled chamber 23 necessarily must also be compliant in order to maintain electrical connection between ship 10 and hydrophone 11.

Electrical conductors 18 are utilized to assist in damping vibrations and dissipating energy by having attached thereto a plurality of baffle means such as baffles 24, 25 and 26 shown in FIG. 3a, 3b and 3c, respectively. These baffles may be interchanged as desired so that one embodiment of the isolator may be provided with baffles all of the type of FIG. 3a, all of the type of FIG. 3b, or all of the type of FIG. 3c, or a combination of the baffles in FIGS. 3a, 3b and 3c. Each of the baffles depicted is provided with holes such as 30 in FIG. 3a or passages in the screen of FIG. 3b or notches such as 31 in FIG. 3c to restrict the movement of oil in the isolator a desired amount so as to absorb undesired energy. The baffles in FIGS. 3a, 3b and 3c have a smaller outer diameter than the inner diameter of isolator 13 and may extend radially substantially to the inner surface of the isolator as desired. These holes or notches or screen openings are adapted to allow the filling fluid to pass through them creating turbulence and dissipating energy.

FIG. 4 illustrates an alternate form of baffle combination in an isolator 35 in that baffles 36 are attached to or made integral with the compliant walls of the isolator. In this embodiment, baffles such as the ring baffle 36 of FIG. 4a or sector baffle 37 of FIG. 4b or other similar types, not shown, provide the turbulence by which energy is dissipated. Sector baffle 37 may be provided with tabs 38 which extend into the oil-filled chamber and create turbulence and dissipate heat as was the function of baffles 24, 25 and 26. The sector type baffle 37 may be arranged with the tabs in alignment along the length of isolator 35 or may have the tabs displaced circumferentially along the inner surface of the isolator to provide increased turbulence and heat dissipation. Although the baffles of FIGS. 4a and 4b are secured to the chamber wall and therefore are not susceptible to a sinusoidal type of movement as would be those baffles secured to the axially extending electrical conductors, each type of baffle provides considerably increased turbulence and heat dissipation over that of conventional isolators.

The compliant member used in isolators 13 and 35 preferably is made of rubber with a selected elasticity so that the degree of elongation under selected tension in the towing cable may be controlled and the resultant fluid motion predicted. Baffles 24, 25, 26, 36 and 37 preferably are made of hard rubber as is bulkhead 20 and headpiece 22 and tailpiece 19.

By providing a compliant isolator, stretching of the isolator is permitted which induces a movement in the oil filling the chamber since the volume of the chamber remains unchanged. This stretching results in oil moving forward to fill the elongate form of the chamber when sufficient tension is supplied by means of the towing cable, the baffles now serving to impede such movement of oil. In addition, a combination of the elements used, the compartments between baffles, the compliance of compliant member 21 and the masses involved serve to filter unwanted energy in a manner somewhat similar to that which occurs in an automobile muffler. This combination of elements acts to prevent the unwanted oscillations, which are carried by or introduced by the towing cable and the passage of the isolator through the water, from interfering with hydrophone reception.

It will be appreciated, therefore, that the present invention provides a cylinder for dissipating vibrational energy in the form of heat energy, such a cylinder permitting a considerably increased impedance to be included in a hydrophone or other sensor circuit to dissipate the undesired oscillations which in the past have necessitated very long, costly and cumbersome isolators. The inclusion of additional energy damping or storage elements described in the present application enables the construction of an isolator having ample interference reducing effectiveness in a much shorter body than the conventional isolator.

Obviously many modifications and variations of the present invention are possible in the light of the above teachings. It is therefore to be understood that within the scope of the appended claims the invention may be practiced otherwise than as specifically described.

What is claimed is:
1. An isolator for substantially reducing or eliminating vibrational noise occasioned by towing by ship of underwater objects comprising:

a tow cable secured at one end to a towing ship;
an isolator secured intermediate the other end of said tow cable and an object to be towed underwater;
said isolator forming an elongate chamber having compliant walls adapted to be stretched under selected cable tension;
a viscous fluid contained in said chamber; and
damping means in said chamber for impeding motion of said fluid induced by stretching of said isolator so that undesired oscillatory and vibrational energy will be dissipated.

2. The device of claim 1 wherein said isolator includes a substantially rigid headpiece and said chamber is cylindrical in shape;
said damping means including a plurality of substantially planar damping elements attached within said chamber and disposed transverse to the longitudinal axis thereof.

3. The device of claim 2 wherein said underwater object is a hydrophone;
an oil-filled carrier conveying said hydrophone;
electrical conductors axially traversing said isolator and said carrier for electrically connecting said hydrophone and said towing ship; and
said damping elements secured so as to extend into the fluid in said chamber to damp fluid motion.

4. The device of claim 3 wherein said damping elements are secured to said electrical conductor traversing said isolator.

5. The device of claim 3 wherein said damping elements are secured to the interior longitudinal surface of said isolator.

6. The device of claim 4 wherein said damping elements are baffles shaped to present a selected resistance to the flow of fluid induced by stretching of said isolator.

7. The device of claim 6 wherein the peripheries of said baffles are disposed a uniform distance from the longitudinal interior surface of said chamber.

8. The device of claim 5 wherein said damping elements are baffles shaped to present a selected resistance to the flow of fluid induced by stretching of said isolator.

9. The device of claim 8 wherein the inner edges of said baffles are spaced a selected distance radially from said electrical conductors when said isolator is in the non-stretched condition.

References Cited
UNITED STATES PATENTS

| | | | |
|---|---|---|---|
| 2,906,992 | 9/1959 | Wilcoxon | 340—8 |
| 3,319,734 | 5/1967 | Pavey | 340—7 X |
| 3,371,311 | 2/1968 | Cholet et al. | 340—8 X |

RICHARD A. FARLEY, Primary Examiner.

U.S. Cl. X.R.

181—.5; 340—7, 8